(12) United States Patent
Kato

(10) Patent No.: US 10,998,594 B2
(45) Date of Patent: May 4, 2021

(54) SEALED SECONDARY BATTERY

(71) Applicant: TOYOTA JIDOSHA KABUSHIKI KAISHA, Toyota (JP)

(72) Inventor: Masashi Kato, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 15/698,121

(22) Filed: Sep. 7, 2017

(65) Prior Publication Data
US 2018/0076424 A1 Mar. 15, 2018

(30) Foreign Application Priority Data
Sep. 9, 2016 (JP) .............................. JP2016-177066

(51) Int. Cl.
*H01M 50/296* (2021.01)
*H01M 50/183* (2021.01)
*H01M 50/10* (2021.01)
*H01M 50/40* (2021.01)
*H01M 50/103* (2021.01)
*H01M 50/531* (2021.01)
H01M 10/0525 (2010.01)
(Continued)

(52) U.S. Cl.
CPC ......... *H01M 50/183* (2021.01); *H01M 50/10* (2021.01); *H01M 50/103* (2021.01); *H01M 50/40* (2021.01); *H01M 50/531* (2021.01); H01M 10/0525 (2013.01); H01M 10/647 (2015.04); H01M 50/296 (2021.01); H01M 50/543 (2021.01); H01M 50/553 (2021.01); H01M 2220/20 (2013.01)

(58) Field of Classification Search
CPC ............ H01M 50/296; H01M 50/543; H01M 50/553; H01M 50/183
See application file for complete search history.

(56) References Cited

U.S. PATENT DOCUMENTS 9,099,754 B2 8/2015 Komatsuki et al.
2010/0266894 A1* 10/2010 Byun .................... H01M 2/263
429/178
(Continued)

FOREIGN PATENT DOCUMENTS

CN 103229344 A 7/2013
CN 104521030 A 4/2015
(Continued)

*Primary Examiner* — Jeremiah R Smith
(74) *Attorney, Agent, or Firm* — Sughrue Mion, PLLC

(57) ABSTRACT

In a secondary battery, a positive electrode current collecting portion and a negative electrode current collecting portion are bonded with a part of a positive electrode current collector exposed portion and a part of a negative electrode current collector exposed portion of a laminated electrode body, respectively. A bonding portion between the positive electrode current collecting portion and the positive electrode current collector exposed portion, and a bonding portion between the negative electrode current collecting portion and the negative electrode current collector exposed portion are formed at positions at which, when the full length in a short side direction of each of the current collector exposed portions of the positive electrode and the negative electrode is set as L, a distance from the end close to the lid in the short side direction is less than L/2.

4 Claims, 6 Drawing Sheets

(51) Int. Cl.
*H01M 50/543* (2021.01)
*H01M 50/553* (2021.01)
*H01M 10/647* (2014.01)

(56) References Cited

U.S. PATENT DOCUMENTS

| | | | | |
|---|---|---|---|---|
| 2011/0052971 A1* | 3/2011 | Fujikawa | ......... | H01M 10/0525 |
| | | | | 429/161 |
| 2011/0143190 A1 | 6/2011 | Cho et al. | | |
| 2012/0077065 A1* | 3/2012 | Kamiya | ................. | H01M 2/06 |
| | | | | 429/94 |
| 2012/0244423 A1* | 9/2012 | Kusukawa | ............. | H01M 4/70 |
| | | | | 429/178 |
| 2014/0045022 A1* | 2/2014 | Matsuda | .......... | H01M 10/0431 |
| | | | | 429/94 |
| 2015/0079478 A1 | 3/2015 | Nakano et al. | | |
| 2015/0111095 A1* | 4/2015 | Sato | ........................ | H01M 2/02 |
| | | | | 429/186 |
| 2015/0207122 A1* | 7/2015 | Yoshitomi | ........... | H01M 2/1686 |
| | | | | 429/145 |
| 2015/0207128 A1* | 7/2015 | Tsunaki | .................. | H01M 2/06 |
| | | | | 429/179 |
| 2015/0236336 A1 | 8/2015 | Hirakawa et al. | | |
| 2015/0303441 A1 | 10/2015 | Takagi | | |
| 2016/0254565 A1 | 9/2016 | Wakimoto et al. | | |

FOREIGN PATENT DOCUMENTS

| | | | | |
|---|---|---|---|---|
| JP | 2009238604 A | | 10/2009 | |
| JP | 2010140862 A | | 6/2010 | |
| JP | 2013105691 | * | 5/2013 | ............. H01M 2/26 |
| JP | 2013105691 A | | 5/2013 | |
| JP | 2013149388 A | | 8/2013 | |
| JP | 2015-210922 A | | 11/2015 | |
| KR | 1020110067915 A | | 6/2011 | |
| KR | 101283091 B1 | | 7/2013 | |

* cited by examiner

SEALED SECONDARY BATTERY

INCORPORATION BY REFERENCE

The disclosure of Japanese Patent Application No. 2016-177066 filed on Sep. 9, 2016 including the specification, drawings and abstract is incorporated herein by reference in its entirety.

BACKGROUND

1. Technical Field

The present disclosure relates to a sealed secondary battery, and specifically, a rectangular sealed secondary battery including a laminated electrode body having a structure in which a plurality of positive and negative electrode sheets are alternately laminated.

2. Description of Related Art

Sealed secondary batteries such as lithium ion secondary batteries and nickel metal hydride batteries have been used not only as so-called portable power sources for computers, mobile terminals, and the like but have also been favorably used as power sources for driving vehicles in recent years. In particular, a lightweight lithium ion secondary battery with a high energy density is preferable as a high output power source for driving a vehicle such as an electric vehicle (EV), a plug-in hybrid vehicle (PHV), and a hybrid vehicle (HV), and the demand therefor is expected to increase in the future. A sealed secondary battery is a battery having a structure in which an electrode body constituting positive and negative electrodes and an electrolyte are housed in a rectangular (box-shaped) hard case made of, in general, a metal, and an opening of the case is sealed. As a general form of the electrode body housed in the sealed secondary battery, a so-called laminated electrode body having a structure in which rectangular sheet-shaped positive electrodes and negative electrodes (hereinafter referred to as "positive electrode sheets" and "negative electrode sheets") are alternately laminated with separators interposed therebetween is exemplified. Since a battery capacity per unit volume is relatively large, the laminated electrode body having such a structure is an appropriate power source for driving a vehicle for which a high capacity and a high output are desired, and the size of the battery or the capacity of the battery can be easily adjusted by increasing or decreasing the number of laminated positive and negative electrode sheets. For example, in Japanese Patent Application Publication No. 2015-210922 (JP 2015-210922 A), an example of a laminated electrode body included in a lithium ion secondary battery having a sealed structure is described. The laminated electrode body disclosed in JP 2015-210922 A has an aspect of a current collecting structure in which positive electrode sheets and negative electrode sheets to be laminated are formed such that current collection tabs protrude from parts of edges of the sheets, and after the laminated electrode body is formed, the current collection tabs of the positive and negative electrodes are superimposed, and are connected to current collector terminals of positive and negative electrodes for external connection.

Meanwhile, since the laminated electrode body has a structure in which positive electrode sheets and negative electrode sheets are alternately laminated with separators interposed therebetween, structural stability is relatively low. Therefore, in order to maintain high rate charging and discharging appropriate for a power source for driving a vehicle for a long time, it is important that the structure of the laminated electrode body be stably maintained inside a case of a sealed battery. For example, in order to prevent the laminated electrode body inside the case from being shaken, a spacer (a thickness adjusting member) is arranged between the laminated electrode body housed inside the case and an inner wall of the case to fill the gap, which is described in JP 2015-210922 A. In addition, in order to minimize positional deviation between laminated positive and negative electrode sheets, a holding tape is attached from one wide surface (one side surface at either end of the laminated electrode body corresponding to the shape of positive and negative electrode sheets in a lamination direction, the same hereinafter) to the other wide surface to cover a lamination surface (a side surface of the laminated electrode body in a positive and negative electrode sheet lamination direction, the same hereinafter) of the laminated electrode body.

SUMMARY

However, the structure for maintaining the laminated electrode body in the aspect described in JP 2015-210922 A is not satisfactory when it is mounted in a vehicle that vibrates while running, and there is still room for improvement. Furthermore, the current collecting structure (current collector tap structure) of the laminated electrode body in the aspect described in JP 2015-210922 A is not satisfactory as a power source for driving a vehicle for which rapid high rate charging and discharging with a relatively high current is necessary while running with vibration, and there is also room for improvement in the current collecting structure. The present disclosure relates to a sealed secondary battery including a laminated electrode body that is particularly suitable as a power source for driving a vehicle (in-vehicle secondary battery) and can obtain a high capacity. The present disclosure provides a sealed secondary battery having a current collecting structure that has favorable structural stability when mounted in a vehicle and excellent high rate charging and discharging characteristics.

The present disclosure provides a secondary battery (sealed secondary battery) having a sealed structure that includes a laminated electrode body having a structure in which a positive electrode including a rectangular sheet-shaped positive electrode current collector and a positive electrode active material layer formed on the current collector and a negative electrode including a rectangular sheet-shaped negative electrode current collector and a negative electrode active material layer formed on the current collector are alternately laminated with a separator therebetween, an electrolyte, and a rectangular case. In the sealed secondary battery of the aspect of the present disclosure, the rectangular case includes a case body in which the laminated electrode body and the electrolyte are housed and a lid for closing an opening of the body. In addition, at one end of each of the positive electrode and the negative electrode in a long side direction, a current collector exposed portion having no active material layer is formed in a short side direction. Therefore, the laminated electrode body has a configuration in which the current collector exposed portions of the positive electrodes are laminated at one end in the long side direction and the current collector exposed portions of the negative electrodes are laminated at the other end in the long side direction. Here, a positive electrode current collecting portion and a negative electrode current collecting portion are attached to a case inner surface side of the lid. A part of the positive electrode current collecting portion and a part of the laminated current collector exposed portions of the positive electrodes are bonded together, and a part of the negative electrode current collecting portion and a part of the laminated current collector exposed portions of the negative electrodes are bonded together.

In the sealed secondary battery having the above configuration, the positive electrode current collector exposed portion and the negative electrode current collector exposed portion of the laminated electrode body having the above configuration are bonded (generally, bonded by welding) to the positive electrode current collecting portion and the negative electrode current collecting portion attached to the inner surface side of the lid, respectively. In this manner, the laminated electrode body which is integrated with the lid via the positive electrode current collecting portion and the negative electrode current collecting portion is housed inside the rectangular case. Therefore, in the sealed secondary battery having the present configuration, it is possible to fix a position and an orientation of the laminated electrode body inside the battery case in which the lid and the case body are bonded together and sealed. As a result, it is possible to prevent the laminated electrode body inside the case from being shaken. In this manner, in the sealed secondary battery having the present configuration, it is possible to realize favorable structural stability of the laminated electrode body.

In addition, in an aspect of the sealed secondary battery disclosed here, the bonding portion between the positive electrode current collecting portion and the positive electrode current collector exposed portion, and the bonding portion between the negative electrode current collecting portion and the negative electrode current collector exposed portion are formed at positions at which, when the full length in the short side direction of each of the current collector exposed portions of the positive electrode and the negative electrode using an end close to the lid as a starting point is set as L, a distance from the end close to the lid in the short side direction is less than L/2. In the sealed secondary battery having the above configuration, the bonding portions of the laminated electrode body on the positive electrode side and the negative electrode side are formed at positions at which the distance from the end close to the lid (generally, the upper surface of the rectangular case when a battery is generally used) in the short side direction is less than L/2. In other words, the welding portion in the wound electrode body integrated with a lid is formed on the side close to the lid. The inventors examined the relationship between the bonding portion between the laminated electrode body and the positive electrode current collecting portion, and the bonding portion between the laminated electrode body and the negative electrode current collecting portion, and the internal resistance of the battery in detail. As a result, it was found that the internal resistance (member resistance inside the battery) greatly changed depending on the position (that is, the distance in the short side direction) at which the bonding portions are formed. That is, in the sealed secondary battery having the present configuration, when the bonding portion between the laminated electrode body and the positive electrode current collecting portion, and the bonding portion between the laminated electrode body and the negative electrode current collecting portion are provided at positions at which the distance in the short side direction is less than L/2, it is possible to minimize the internal resistance of the battery. Therefore, in the sealed secondary battery having the present configuration, it is possible to realize a favorable current collecting structure of the laminated electrode body.

Furthermore, if the bonding portions are provided at the positions described above, when a gas (generally, generated when an electrolyte decomposes) is generated inside the case due to an unexpected abnormal condition such as abnormal heat in the event of overcharge or internal short circuiting, the bonding portions (and the vicinities thereof) provided on the side close to the lid (that is, adjacent to the lid) may serve as obstacles (barriers) with respect to a flow path through which the gas generated inside the laminated electrode body flows to the outside from the electrode body. Therefore, most of the gases generated inside the laminated electrode body necessarily flow from the electrode body portion away from the lid, and it is possible to prevent gases generated inside the laminated electrode body from accumulating on the side of the lid. Accordingly, in addition to the structural stability, higher safety can be realized.

In another form of the sealed secondary battery of the aspect disclosed here, the bonding portion between the positive electrode current collecting portion and the positive electrode current collector exposed portion, and the bonding portion between the negative electrode current collecting portion and the negative electrode current collector exposed portion may be formed at positions at which the distance from the end close to the lid in the short side direction is less than L/4. In such a configuration, it is possible to further minimize the internal resistance of the battery, and a more favorable current collecting structure can be realized.

In still another form of the sealed secondary battery of the aspect disclosed here, the bonding portion between the positive electrode current collecting portion and the positive electrode current collector exposed portion, and the bonding portion between the negative electrode current collecting portion and the negative electrode current collector exposed portion may be formed at positions at which, when the total thickness of the laminated electrode body in the lamination direction is set as D, the distance from the end close to the lid in the short side direction is D/2 or less. In such a configuration, it is possible to further minimize the internal resistance of the battery, and a more favorable current collecting structure can be realized.

The separator of the laminated electrode body disclosed here may include an adhesive for improving adhesion to the facing positive electrode or negative electrode. When the separator including an adhesive (hereinafter referred to as a separator including an adhesive) is used as the separator of the laminated electrode body, it is possible to further minimize positional deviation between the laminated positive electrode sheet and negative electrode sheet. Therefore, it is possible to further increase structural stability of the laminated electrode body inside the rectangular case. Here, the separator may be an independent and separate member different from the positive electrode and the negative electrode, or may be integrally formed as a layer on surfaces of the positive electrode and/or negative electrode in advance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
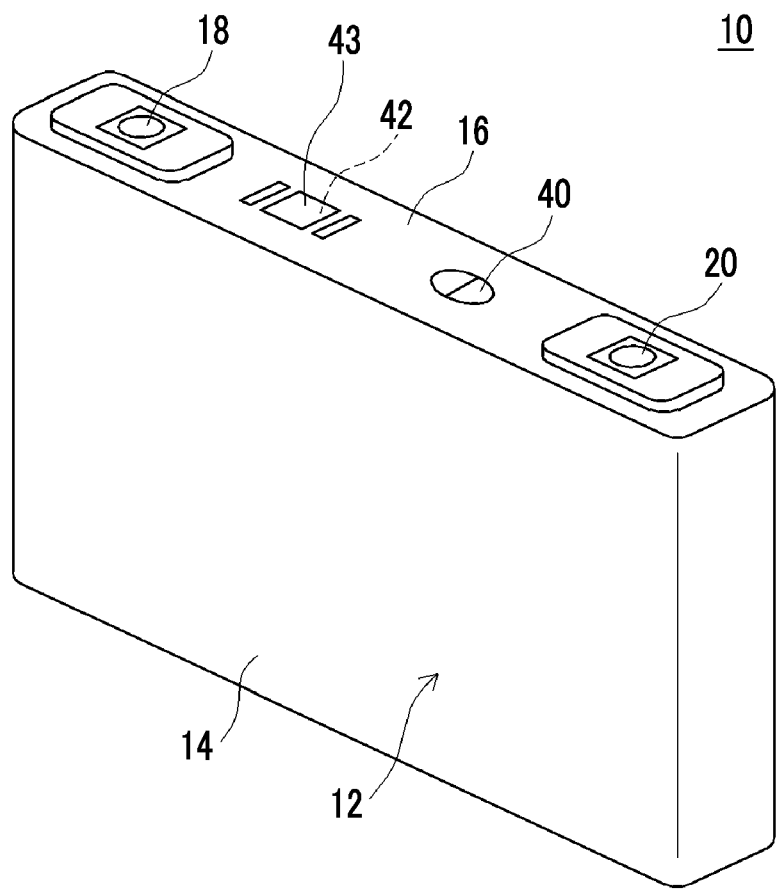
FIG. 1 is a perspective view schematically showing an external form of a sealed secondary battery (lithium ion secondary battery) according to an embodiment.

As an example of a sealed secondary battery described here, a preferred embodiment of a lithium ion secondary battery will be described below in detail with reference to the drawings. Components other than those particularly mentioned in this specification that are necessary for implementation can be recognized by those skilled in the art as design matters based on the related art in the field. The present disclosure can be implemented based on content disclosed in this specification and common general technical knowledge in the field. While the following embodiment relates to a lithium ion secondary battery, the embodiment of the present disclosure is not limited to the lithium ion secondary battery, and the present disclosure can be suitably applied to other sealed secondary batteries, for example, an electric double layer capacitor, a lithium ion capacitor, and a sodium ion secondary battery. In this specification, "active material" refers to a substance involved in occlusion and release of charge carriers (for example, lithium ions in a lithium ion secondary battery) on a positive electrode side or a negative electrode side. Here, a numerical range of A to B (A and B are arbitrary numbers) in this specification indicates A or more and B or less.

As an example of a sealed secondary battery disclosed here, a lithium ion secondary battery in the form in which a laminated electrode body and an electrolyte (a nonaqueous electrolyte in the present embodiment) are housed in a rectangular (that is, a rectangular parallelepiped box shape) case will be exemplified below. The sizes (a length, a width, a thickness, and the like) in the drawings do not reflect actual sizes. In addition, members and portions having the same functions are denoted by the same reference numerals, and redundant descriptions will be omitted or simplified.

As shown in FIG. 1, a lithium ion battery 10 according to the present embodiment is a sealed secondary battery having a configuration in which a flat laminated electrode body 50 (refer to FIG. 3) to be described below is housed in a flat rectangular case 12 (that is, an external container of the battery 10) corresponding to the shape of the laminated electrode body 50 together with an electrolyte (not shown; here a nonaqueous electrolyte). The rectangular case 12 includes a case body 14 having a box shape (that is, a rectangular parallelepiped shape having a bottom) whose one end (corresponding to an upper surface in a general use state of the battery 10) is open and a lid 16 which is attached to the opening and includes a rectangular plate member that closes the opening. When the lid 16 is welded to the perimeter of the opening of the case body 14, the rectangular case 12 having a hexahedral sealed structure including a pair of case wide surfaces that face the wide surface of the flat laminated electrode body and four rectangular side surfaces (that is, the lid 16 is formed on one upper surface among them) adjacent to the case wide surface is formed. Although not particularly limited, as preferred sizes of a rectangular case of a battery of this type, a length of 80 mm to 200 mm for the long side of the case body 14 and the lid 16: a length of 8 mm to 40 mm for the short side of the case body 14 and the lid 16 (that is, the thickness of the case 12): and a height of 70 mm to 150 mm for the case 12 can be exemplified. The size of the laminated electrode body may be defined as a size at which the laminated electrode body can be housed in a rectangular case to be used, and is not particularly limited.

Materials of the rectangular case 12 (the case body 14 and the lid 16) may be the same as those used in sealed secondary batteries of the related art and are not particularly limited. The case 12 that mainly includes a lightweight metallic material having favorable thermal conductivity is preferable. Examples of such metallic materials include aluminum, stainless steel, and nickel-plated steel. As shown in FIG. 1, a negative electrode terminal 18 and a positive electrode terminal 20 for external connection are integrally formed on the outer surface side of the lid 16. External connection terminals having appropriate shapes can be connected to these external positive and negative electrode terminals 18 and 20 according to the usage form of the lithium ion secondary battery 10 according to the present embodiment. Here, between both terminals 18 and 20 of the lid 16, a thin-walled safety valve 40 configured to release an internal pressure when the internal pressure of the case 12 increases to a predetermined level or higher, and a liquid injection port 42 through which a nonaqueous electrolyte is supplied are formed. FIG. 1 shows a state after liquid injection is completed, and the liquid injection port 42 is sealed with a sealing material 43. Here, the mechanism of the safety valve 40, and the sealing form of the liquid injection port are the same as those of batteries of this type in the related art, and special configurations are unnecessary.

Figure 2:
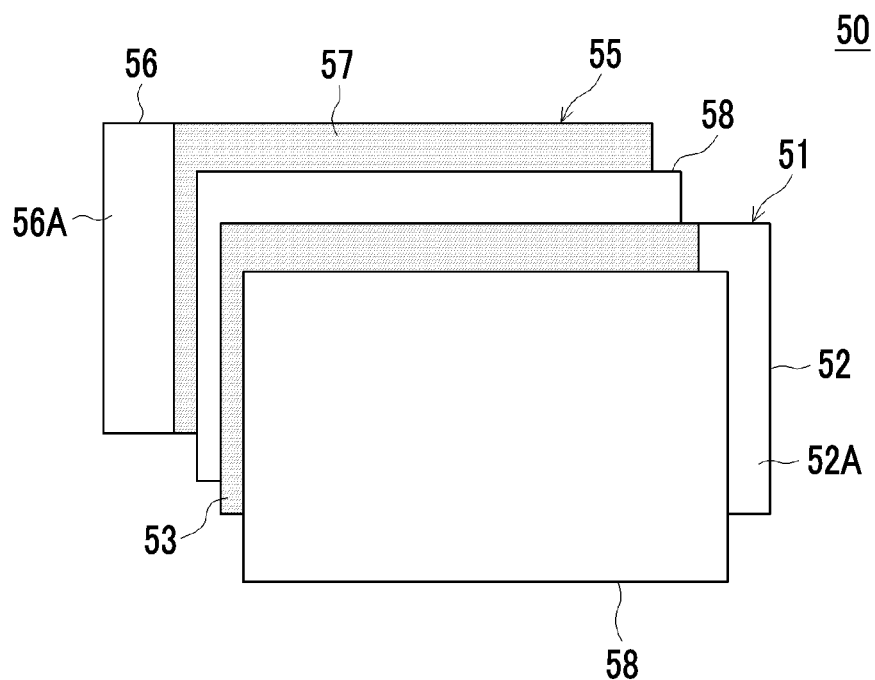
FIG. 2 is an explanatory diagram schematically showing members of a laminated electrode body according to an embodiment.

As shown in FIG. 2, the laminated electrode body 50 according to the present embodiment has a configuration in which a rectangular positive electrode sheet 51 and a negative electrode sheet 55 having the same rectangular shape as the positive electrode sheet 51 are alternately laminated with a sheet-shaped separator 58 having the same rectangular shape interposed therebetween. In the positive electrode sheet 51, a positive electrode active material layer 53 is formed on both surfaces of a long sheet-shaped positive electrode current collector 52. In the negative electrode sheet 55, a negative electrode active material layer 57 is formed on both surfaces of a long sheet-shaped negative electrode current collector 56. However, as shown in FIG. 2, at one end of the rectangular positive electrode current collector 52 in a long side direction, a positive electrode current collector exposed portion 52A having no positive electrode active material layer 53 is formed in a strip shape in a short side direction. Similarly, at the other end of the rectangular negative electrode current collector 56 in the long side direction, a negative electrode current collector exposed portion 56A having no negative electrode active material layer 57 is formed in a strip shape in the short side direction.

Figure 3:
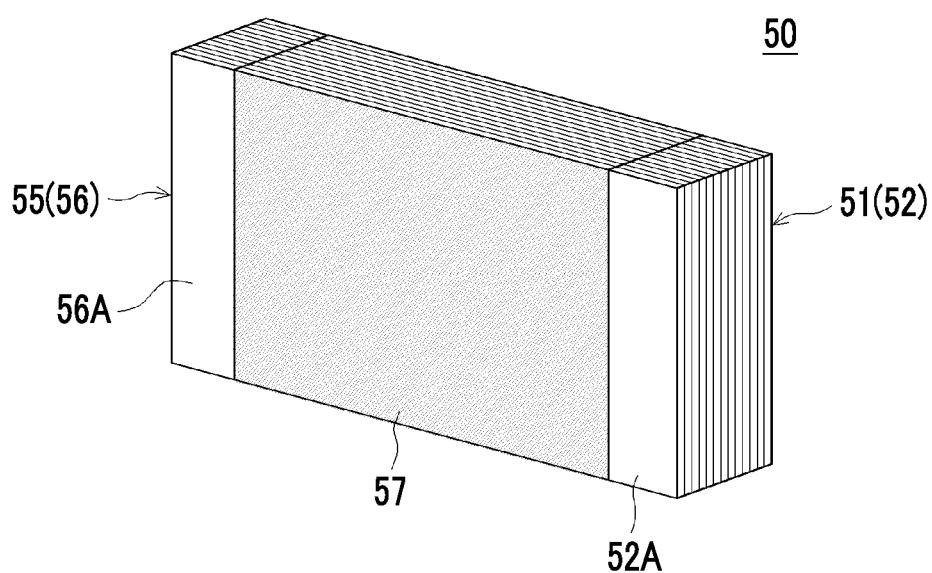
FIG. 3 is a perspective view schematically showing a configuration of a laminated electrode body according to an embodiment.

As shown in FIG. 2 and FIG. 3, the positive electrode sheet 51 and the negative electrode sheet 55 are laminated such that they are slightly shifted in position from each other in the long side direction, and the positive electrode current collector exposed portion 52A protrudes from one end of the separator 58 in the long side direction and the negative electrode current collector exposed portion 56A protrudes from the other end. As a result, as shown in FIG. 3, a portion in which the positive electrode current collector exposed portions 52A are laminated and a portion in which the negative electrode current collector exposed portions 56A are laminated are formed at one end and the other end of the laminated electrode body 50 in the long side direction, respectively. Here, in the laminated electrode body 50 according to the present embodiment, in consideration of favorable and stable occlusion and release of charge carriers, it is preferable that the size of the negative electrode active material layer 57 in the long side direction be set to be larger than the size of the positive electrode active material layer 53 in the long side direction. In addition, in order to reliably perform insulation between the positive electrode active material layer 53 and the negative electrode active material layer 57, the size of the separator 58 in the long side direction is preferably set to be larger than these sizes in the long side direction thereof. The components will be described below in detail.

As materials and members of positive and negative electrodes of the laminated electrode body 50, those used in general lithium ion secondary batteries of the related art can be used without limitation. For example, as the positive electrode current collector 52, positive electrode current collectors used in lithium ion secondary batteries of this type may be used without particular limitation. Generally, a metallic positive electrode current collector having favorable conductivity is preferable. For example, a metal material such as aluminum, nickel, titanium, and stainless steel may be used. In particular, aluminum (for example, an aluminum foil) is preferable. The thickness of the positive electrode current collector 52 is not particularly limited. However, in consideration of the balance between a capacity density of the battery and a strength of the current collector, about 5 µm to 50 µm is preferable, and about 8 µm to 30 µm is more preferable.

As a positive electrode active material, for example, lithium composite metal oxides having a layered structure, a spinel structure, or the like (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, $LiCrMnO_4$, and $LiFePO_4$) may be exemplified. For example, a LiNiCoMn composite oxide (for example, $LiNi_{1/3}Co_{1/3}Mn_{1/3}O_2$) is a preferable example because it has excellent thermal stability and high energy density. Alternatively, a lithium manganese composite oxide having a spinel structure may be exemplified as a preferred example. $LiMn_2O_4$, $LiCrMnO_4$, $LiNi_{0.5}Mn_{1.5}O_4$, and the like may be exemplified. Since such positive electrode active materials are high potential positive electrode active materials with which an open circuit voltage (OCV) according to the lithium metal standard (vs. $Li/Li^+$) of 4.3 V or more can be realized, they are appropriate positive electrode active materials. The positive electrode active material layer 53 may contain components other than the positive electrode active material, for example, a conductive material and a binder. As the conductive material, carbon black such as acetylene black (AB) and other carbon materials (such as graphite) may be suitably used. As the binder, polyvinylidene fluoride (PVDF) may be used. The thickness of a positive electrode active material layer 53 is generally 10 µm or more (for example, 50 µm or more), and can be 200 µm or less (for example, 100 µm or less). In addition, the density of the positive electrode active material layer 53 is not particularly limited, but is generally 1.5 $g/cm^3$ or more (for example, 2 $g/cm^3$ or more), and can be 4.5 $g/cm^3$ or less (for example, 4.2 $g/cm^3$ or less). The positive electrode active material layer 53 having such a configuration can obtain high battery performance (for example, high energy density and output density). The positive electrode active material layer 53 can be formed when a positive electrode active material and a material (such as a conductive material and a binder) used as necessary are dissolved in an appropriate solvent (for example, N-methyl-2-pyrrolidone: NMP) to prepare a paste-like (or slurry-like) composite, an appropriate amount of the composite is applied to a surface of the positive electrode current collector 52, and drying is performed. In addition, when appropriate pressing is performed as necessary, it is possible to adjust properties (for example, an average thickness, a density, and a porosity) of the positive electrode active material layer 53.

Meanwhile, as the negative electrode current collector 56, negative electrode current collectors used in a lithium ion secondary battery of this type may be used without particular limitation. Generally, a metallic negative electrode current collector having favorable conductivity is preferable. For example, copper (for example, a copper foil) and an alloy that mainly includes copper can be used. The thickness of the negative electrode current collector 56 is not particularly limited. However, in consideration of the balance between a capacity density of the battery and a strength of the current collector, about 5 µm to 50 µm is preferable and about 8 µm to 30 µm is more preferable.

As a negative electrode active material, one type or two or more types of material used in lithium ion secondary batteries of the related art can be used without particular limitation. For example, a particulate (or spherical, scaly) carbon material of which at least a part has a graphite structure (layered structure), a lithium transition metal composite oxide (for example, lithium titanium composite oxide such as $Li_4Ti_5O_{12}$), and a lithium transition metal composite nitride may be exemplified. As the carbon material, for example, natural graphite, artificial graphite (synthetic graphite), non-graphitizable carbon (hard carbon), easily graphitizable carbon (soft carbon), and the like may be exemplified. Alternatively, carbon particles in the form in which graphite particles as cores are covered (coated) with an amorphous carbon material may be used. The negative electrode active material layer 57 can contain optional components such as a binder and a thickener as necessary in addition to the negative electrode active material. As the binder and the thickener, those used in negative electrodes of lithium ion secondary batteries of this type of the related art can be appropriately used. For example, as the binder, styrene butadiene rubber (SBR) or the like may be used. As the thickener, carboxymethyl cellulose (CMC) or the like may be suitably used. The thickness of the negative electrode active material layer 57 is generally 20 µm or more (for example, 50 µm or more), and preferably 200 µm or less (for example, 100 µm or less). In addition, the density of the negative electrode active material layer 57 is not particularly limited, and is generally 0.5 g/cm³ or more (for example, 1 g/cm³ or more), and preferably about 2 g/cm³ or less (for example, 1.5 g/cm³ or more). The negative electrode active material layer 57 can be formed when a negative electrode active material and a material (such as a binder) used as necessary are dissolved in an appropriate solvent (for example, deionized water) to prepare a paste-like (or slurry-like) composite, an appropriate amount of the composite is applied to a surface of the negative electrode current collector 56, and drying is performed. In addition, when appropriate pressing is performed as necessary, it is possible to adjust properties (for example, an average thickness, a density, and a porosity) of the negative electrode active material layer 57.

As the separator 58, a separator including a porous sheet known in the related art can be used without particular limitation. For example, a porous sheet (such as a film and a nonwoven fabric) made of a polyolefin resin such as polyethylene (PE), polypropylene (PP), or the like may be exemplified. The porous sheet may have a single layer structure or may have a structure having two or more layers (for example, a three-layer structure in which a PP layer is laminated on both surfaces of a PE layer). In addition, a configuration in which a porous heat resistant layer is provided on one surface or both surfaces of a porous sheet may be used. The heat resistant layer may be, for example, a layer (referred to as a filler layer) containing an inorganic filler and a binder. As the inorganic filler, for example, alumina, boehmite, silica, or the like may be preferably used. The thickness of the separator is not limited, but is preferably set within the range of, for example, 10 µm to 40 µm.

As the separator 58 to be used, a separator including an adhesive by which the adhesion to the facing positive electrode sheet 51 (mostly the positive electrode active material layer 53) or negative electrode sheet 55 (mostly the negative electrode active material layer 57) can be improved is particularly preferable. When the adhesive is included, it is possible to increase the adhesive strength with respect to at least one (or both) of the positive electrode sheet 51 and the negative electrode sheet 55 to be laminated. As a result, it is possible to minimize positional deviation between the positive and negative electrode sheets 51 and 55 to be laminated, and it is possible to improve structural stability of the laminated electrode body 50. The form of the separator including an adhesive is not particularly limited, and various forms can be used. For example, a separator in which an adhesive layer including an adhesive component with an adhesive (or sticky) resin compound such as a fluororesin, an acrylic resin, a polyamide resin, a polyimide resin, or a polyurethane resin is formed on a surface of a substrate including a porous sheet made of a polyolefin may be exemplified. The thickness of the adhesive layer is not particularly limited, and about 0.2 µm to 1.0 µm is appropriate.

The laminated electrode body 50 is formed when a desired number of sets of the positive electrode sheet 51, the negative electrode sheet 55, and the separator 58 (preferably, a separator including an adhesive) having the above configuration are laminated and an appropriate pressure is applied in the lamination direction. In this case, when heat pressing is performed at a desired temperature as necessary, it is possible to improve the adhesion between the separator (in particular, a separator including an adhesive) and the facing positive and negative electrodes. The size of the laminated electrode body 50 is not particularly limited. The laminated electrode body 50 can have a shape corresponding to the size of the above-described case.

The nonaqueous electrolyte which is housed in the rectangular case 12 together with the laminated electrode body 50 is an electrolyte in which a supporting salt is contained in an appropriate nonaqueous solvent. Nonaqueous electrolytes used for lithium ion secondary batteries known in the related art can be used without particular limitation. For example, as the nonaqueous solvent, ethylene carbonate (EC), diethyl carbonate (DEC), dimethyl carbonate (DMC), ethyl methyl carbonate (EMC), or the like can be used. In addition, as the supporting salt, for example, a lithium salt such as $LiPF_6$ can be suitably used.

Various additives (for example, a film forming material) may be added to the nonaqueous electrolyte in addition to the nonaqueous solvent and the supporting salt. For example, a lithium salt having an oxalato complex as an anion such as lithium bis(oxalato)borate ($LiB(C_2O_4)_2$), $LiBF_2(C_2O_4)$, and $LiPF_2(C_2O_4)$, lithium difluorophosphate ($LiPO_2F_2$), vinylene carbonate (VC), vinyl ethylene carbonate (VEC), fluoroethylene carbonate (FEC), ethylene sulfite (ES), propane sultone (PS), and lithium bis(trifluoromethanesulfonyl)imide (LiTFSI) may be exemplified. These additives can be used alone or in a combination of two or more types. As the concentration of the additive in the nonaqueous electrolyte, when a limit amount of dissolution of each additive in a nonaqueous solvent used is set to 100%, a concentration obtained when 5 to 90% thereof is dissolved in the nonaqueous electrolyte is preferable. Generally, when ($LiB(C_2O_4)_2$) or $LiPO_2F_2$ is used, the concentration is preferably adjusted to be within the range of 0.01 mol/L or more and 0.2 mol/L or less. For example, the additive can be added so that the concentration in the nonaqueous electrolyte is 0.01 mol/L or more and 0.1 mol/L or less.

Figure 4:
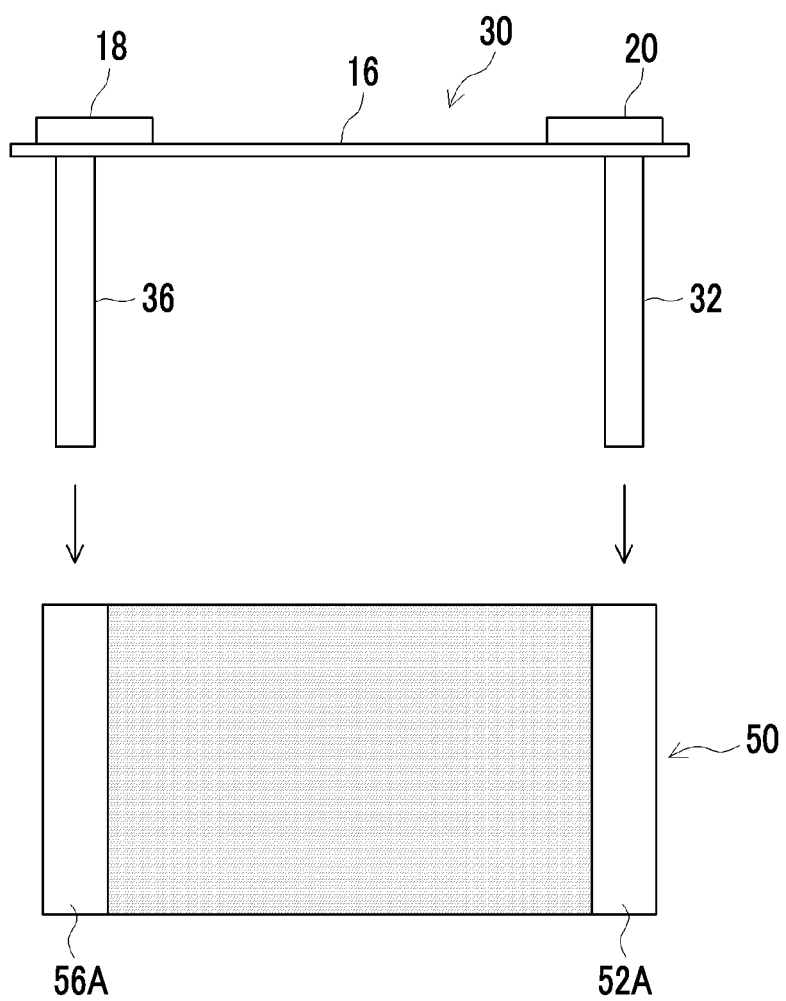
FIG. 4 is a diagram describing assembling of a lid-integrated current collector assembly and a laminated electrode body according to an embodiment.
Figure 6:
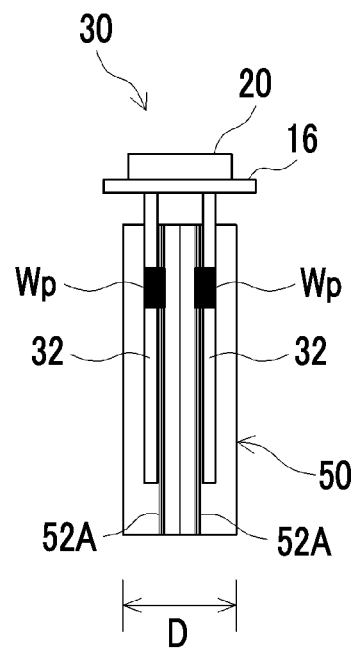
FIG. 6 is a side view on a positive electrode side schematically showing bonding portions between positive and negative electrode current collecting portions and positive and negative electrode current collector exposed portions according to an embodiment.
Figure 7:
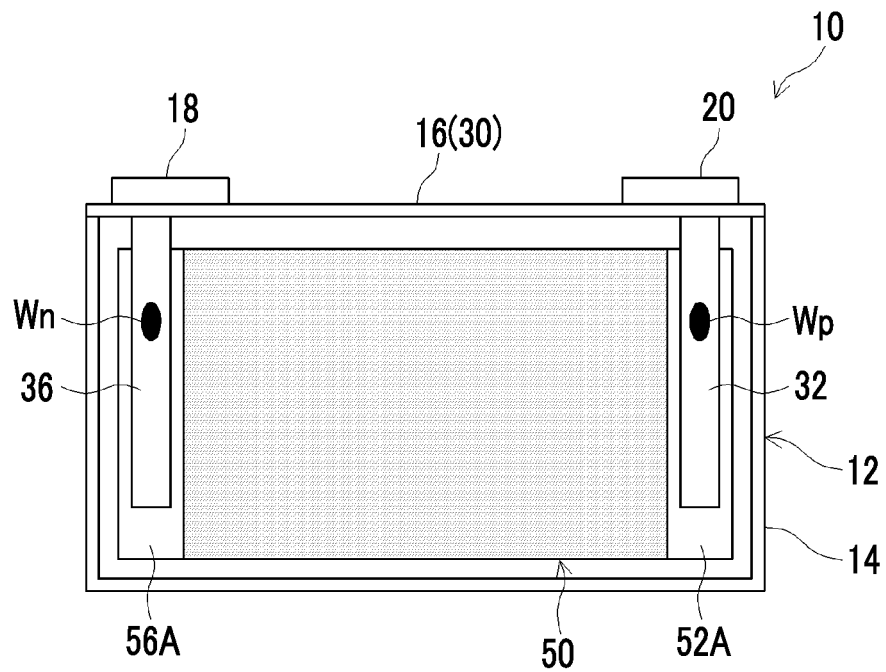
FIG. 7 is a front view schematically showing a state in which a lid-integrated current collector assembly and a laminated electrode body are installed in a case body according to an embodiment.

Thus, the lithium ion secondary battery 10 according to the present embodiment is formed using the laminated electrode body 50 having the above configuration and the nonaqueous electrolyte. As schematically shown in FIG. 4, on the inner surface side of the lid 16 according to the present embodiment, a positive electrode current collecting portion 32 and a negative electrode current collecting portion 36 electrically connected to the positive electrode terminal 20 and the negative electrode terminal 18 are provided to protrude downward from the lid 16. Specifically, as shown in FIG. 4 and FIG. 6, the positive electrode current collecting portion 32 and the negative electrode current collecting portion 36 according to the present embodiment are formed as two long current collector plates that extend in parallel in the short side direction of the laminated electrode body 50 arranged inside the case 12. In this manner, in the present embodiment, a lid-integrated current collector assembly 30 in which the lid 16, the positive and negative electrode terminals 20 and 18, and the long plate positive and negative electrode current collecting portions 32 and 36 are integrated is formed. Then, when the laminated electrode body 50 is attached to the lid-integrated current collector assembly 30 using a bonding method such as welding, the laminated electrode body 50 inside the case 12 is integrated with and fixed to the lid 16, and thus it is possible to maintain the orientation and the structure of the laminated electrode body 50 at a high level. Here, materials of the positive and negative electrode current collecting portions 32 and 36 are not particularly limited but may be a metal that is the same as or similar to that of the corresponding positive and negative electrode current collectors.

Figure 5:
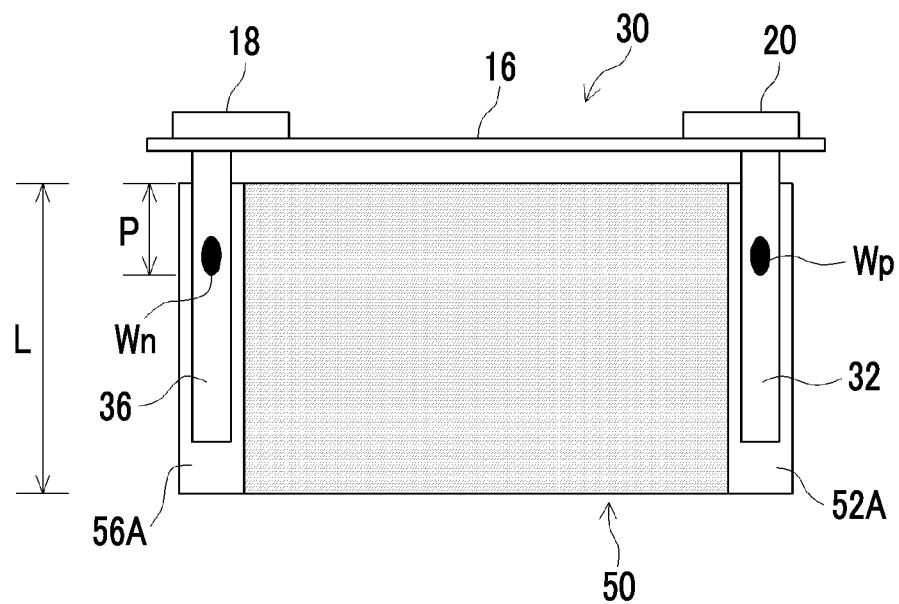
FIG. 5 is a front view schematically showing bonding portions between positive and negative electrode current collecting portions and positive and negative electrode current collector exposed portions according to an embodiment.

Specifically, as shown in FIG. 4, the positive electrode current collecting portion 32 of the lid-integrated current collector assembly 30 is arranged on the positive electrode current collector exposed portion 52A of the laminated electrode body 50, and the negative electrode current collecting portion 36 of the lid-integrated current collector assembly 30 is arranged on the negative electrode current collector exposed portion 56A of the laminated electrode body 50. Therefore, the lid-integrated current collector assembly 30 and the laminated electrode body 50 are aligned and assembled. Then, a number of the positive and negative electrode current collector exposed portions 52A and 56A which are laminated according to the number of the laminated positive and negative electrode sheets 51 and 55 are distributed to the positive and negative electrode current collecting portions 32 and 36. Generally, as shown in FIG. 6, the positive electrode current collector exposed portion 52A is uniformly divided into two bundles and each of the bundles is distributed to any of two positive electrode current collecting portions 32 (this similarly applies between the negative electrode current collector exposed portion 56A and the negative electrode current collecting portion 36 which are not shown). Then, as shown in FIG. 5 and FIG. 6, parts of the positive and negative electrode current collecting portions 32 and 36 undergo spot welding. Accordingly, the laminated electrode body 50 in a conductive state is bonded to the lid-integrated current collector assembly 30 at bonding portions (welding portions Wp and Wn in the present embodiment) on the positive electrode side and the negative electrode side. The method of spot welding may be the same as in the related art, and is not limited to special welding methods. For example, ultrasonic welding, resistance welding, laser welding, or the like may be used for bonding.

In the lithium ion secondary battery 10 disclosed here, as shown in the drawings, the bonding portion Wp between the positive electrode current collecting portion 32 and the positive electrode current collector exposed portion 52A, and the bonding portion Wn between the negative electrode current collecting portion 36 and the negative electrode current collector exposed portion 56A are formed at positions at which, when the full length in a short side direction of each of the current collector exposed portions 52A and 56A of the positive and negative electrodes using an end close to the lid 16 as a starting point is set as L, a distance P from the end close to the lid 16 in the short side direction is less than L/2 (refer to FIG. 5). When the distance P is less than L/3, it is more preferable, and when the distance P is less than L/4, it is particularly preferable. Regarding bonding of the laminated electrode body 50 and the lid-integrated current collector assembly 30, when the bonding (welding) portions Wp and Wn are set to be close to the lid 16 (in other words, the upper surface of the case 12) in this manner, it is possible to prevent the internal resistance of the battery from increasing. That is, when the bonding (welding) portions Wp and Wn are set to be close to the lid (the upper surface) in this manner, it is possible to realize a favorable current collecting structure of the laminated electrode body 50. In addition, in a preferred aspect, the bonding portions Wp and Wn between the laminated electrode body 50 and the lid-integrated current collector assembly 30 are formed at positions at which, when the total thickness of the laminated electrode body 50 in the lamination direction is set as D, the distance P from the end close to the lid 16 in the short side direction is D/2 or less. It is possible to further suitably minimize the internal resistance of the battery, and it is possible to realize a more favorable current collecting structure (refer to test examples to be described below).

As described above, the bonding portions Wp and Wn are set, spot welding is performed, and the laminated electrode body 50 and the lid-integrated current collector assembly 30 which are bonded together are then installed in the case body 14 while the laminated electrode body 50 is housed inside the case. Then, an opening peripheral portion of the case body 14 and a peripheral portion of the lid 16 are welded to seal the rectangular case 12. Then, a nonaqueous electrolyte is injected from the liquid injection port 42 provided in the lid 16. Next, the liquid injection port 42 is closed by the predetermined sealing material 43, and thus the lithium ion secondary battery 10 according to the present embodiment is formed. After the formation, an initial charging treatment, an aging treatment, and the like are performed under predetermined conditions, and thus the lithium ion secondary battery 10 in an usable state is provided.

Figure 8:
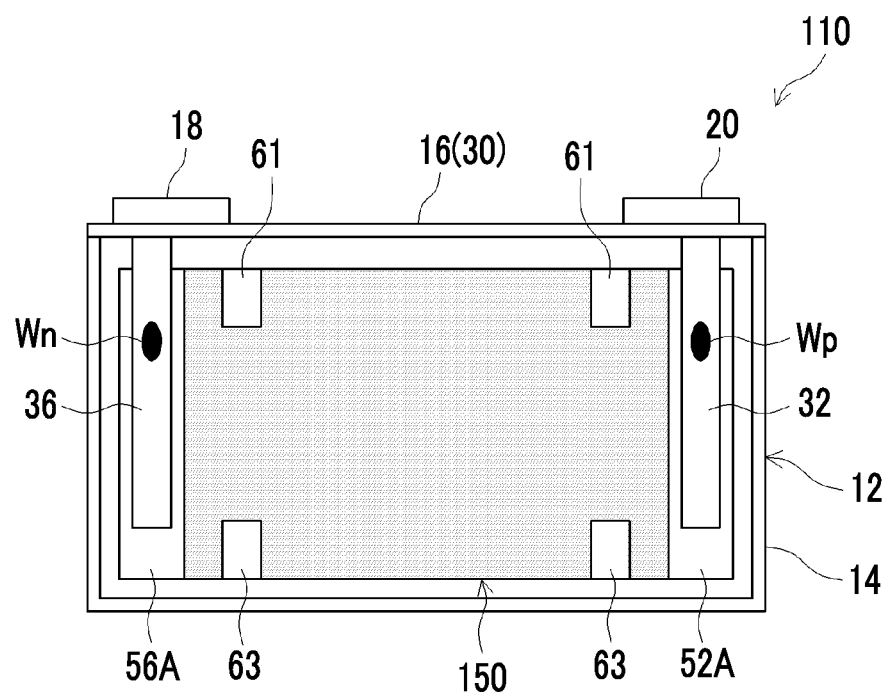
FIG. 8 is a front view schematically showing a state in which a lid-integrated current collector assembly and a laminated electrode body are installed in a case body according to another embodiment.

While the sealed secondary battery of the preferred embodiment of the present disclosure has been described in detail above with reference to the drawings, the present disclosure is not limited thereto. For example, in order to further improve structural stability of the laminated electrode body 50, like a laminated electrode body 150 of a lithium ion secondary battery 110 shown in FIG. 8, holding tapes 61 and 63 for holding and binding positive and negative electrode sheets and separators constituting the electrode body 150 in the lamination direction may be attached from one wide surface to the other wide surface to cover a lamination surface of the laminated electrode body 150. The number of the holding tapes 61 and 63 used and attachment positions thereof are not particularly limited. In the sealed secondary battery disclosed here, as described above, the bonding portions Wp and Wn between the laminated electrode body 50 and the lid-integrated current collector assembly 30 are provided at positions (D/2 or less) close to the lid 16. Therefore, as shown in FIG. 8, a position (for example, an attachment position of the holding tape 63 in FIG. 8) along the long side that faces the bottom of the case body 14 is preferable as the attachment position of the holding tape 63. In addition to the position along the long side that faces the bottom, the holding tape 61 is also attached at a position (for example, the attachment position of the holding tape 61 in FIG. 8) along the long side that faces the upper surface of the case (the lid 16 in the above embodiment). Therefore, it is possible to obtain the laminated electrode body 150 having further improved structural stability.

Figure 9:
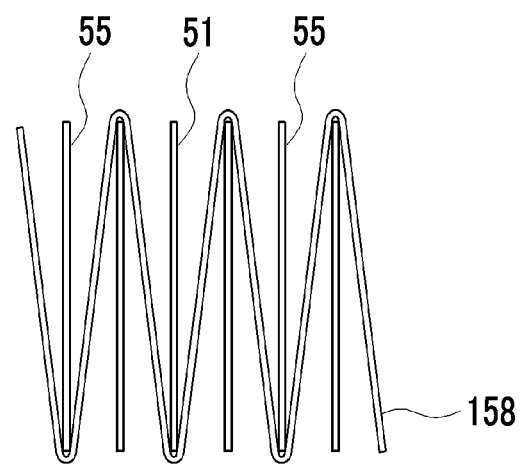
FIG. 9 is a diagram describing a shape of a separator sheet and an arrangement state of positive and negative electrode sheets according to another embodiment.

In addition, as the separator, a separator 158 having a long sheet shape (band shape) shown in FIG. 9 may be used instead of the plurality of separators 58 having a rectangular sheet shape similar to the positive and negative electrode sheets 51 and 55 as shown in FIG. 2. In this case, generally, as shown in FIG. 9, a separator 158 that is folded at predetermined intervals in a zigzag manner is preferably used. The positive electrode sheet 51 and the negative electrode sheet 55 can be arranged in recesses (concave parts) of the separator 158 folded in a zigzag manner in a positive and negative electrode alternate manner. Here, the separator is not limited to a member separate from the positive and negative electrodes as shown in the drawing, and may be integrally formed as a layer on surfaces of the positive electrode and/or the negative electrode in advance. A separator layer integrally formed as a layer on surfaces of the positive electrode and/or the negative electrode in advance may be used.

Test examples related to the present disclosure will be described below. The present disclosure is not intended to be limited to the test examples (examples). According to the following materials and processes, evaluation test lithium ion secondary batteries according to Examples 1 to 5 shown in Table 1 were formed.

<Formation of lithium ion secondary battery> A positive electrode of an evaluation test lithium ion secondary battery was prepared according to the following procedures. A spinel high potential positive electrode active material powder: $LiNi_{0.5}Mn_{1.5}O_4$ (LNM), acetylene black (AB) as a conductive material, and PVDF as a binder were mixed at a mass ratio of LNM:AB:PVDF=90:8:2 with NMP to prepare a composite for forming a slurry-like positive electrode active material layer. The composite was applied to both surfaces of a 120 mm×80 mm rectangular aluminum foil (a positive electrode current collector) with a thickness of 15 μm, and drying and pressing were performed to prepare a positive electrode sheet. Here, a positive electrode current collector exposed portion with a width of about 2.6 cm in the short side direction was provided at one end in the long side direction.

A negative electrode of the evaluation test lithium ion secondary battery was prepared according to the following procedures. As a negative electrode active material powder, graphite (C) of which a surface was coated with amorphous carbon was prepared. Then, the graphite (C), SBR as a binder, and CMC as a thickener were mixed at a mass ratio of C:SBR:CMC=98:1:1 with deionized water to prepare a composite for forming a slurry-like negative electrode active material layer. The composite was applied to both surfaces of a 120 mm×80 mm rectangular copper foil (a negative electrode current collector) with a thickness of 10 μm, and drying and pressing were performed to prepare a negative electrode sheet. Here, a negative electrode current collector exposed portion with a width of about 2.4 cm in the short side direction was provided at one end in the long side direction.

The plurality of positive electrode sheets and the negative electrode sheets prepared as described above were alternately laminated with separators including a polyolefin sheet having the same shape as a substrate and an adhesive layer containing a fluororesin on both surfaces, were heated to a predetermined temperature range (about 70 to 80° C.), and pressed to form a laminated electrode body with a laminate thickness of 25 mm. Next, the formed laminated electrode body was housed inside a battery case having a corresponding rectangular shape. Specifically, a lid-integrated current collector assembly having the same configuration as in the above-described embodiment was prepared. Positive and negative electrode current collecting portions of the lid-integrated current collector assembly and positive and negative electrode current collector exposed portions of the laminated electrode body were bonded at predetermined positions (bonding portions) by spot welding (ultrasonic welding).

Here, as shown in Table 1, for the bonding portion between the positive electrode current collecting portions and the positive electrode current collector exposed portion, and the bonding portion between the negative electrode current collecting portions and the negative electrode current collector exposed portion, when the full length in a short side direction (height direction) of each of the current collector exposed portions of the positive and negative electrodes using an end (that is, upper side part of the electrode body) close to the lid as a starting point was set as L (80 mm), the bonding portions of the batteries of Example 1, Example 2, Example 3, Example 4 and Example 5 were at L/10 (8 mm), L/6.6 (12 mm), L/4 (20 mm), L/2 (40 mm), and L/1.1 (73 mm). Here, when the total thickness of the laminated electrode body in the lamination direction was set as D (25 mm), the bonding portions in the batteries of Example 1 and Example 2 can be indicated as being at D/3 (8 mm) and D/2 (12 mm), respectively.

The laminated electrode body and the lid-integrated current collector assembly integrated by the spot welding were installed in a battery case body having a rectangular shape and sealed by welding the periphery of the lid. Next, a nonaqueous electrolyte was injected from the liquid injection port provided in the lid and the opening was sealed. Here, a nonaqueous electrolyte prepared by dissolving $LiPF_6$ serving as a supporting salt at a concentration of 1.1 mol/L in a solvent mixture containing EC, EMC, and DMC at a volume ratio of EC:EMC:DMC=30:40:30, and additionally containing $LiB(C_2O_4)_2$ as an additive material at a concentration of about 0.05 mol/L was used. In this manner, the evaluation test lithium ion secondary batteries according to Examples 1 to 5 were prepared.

Figure 10:
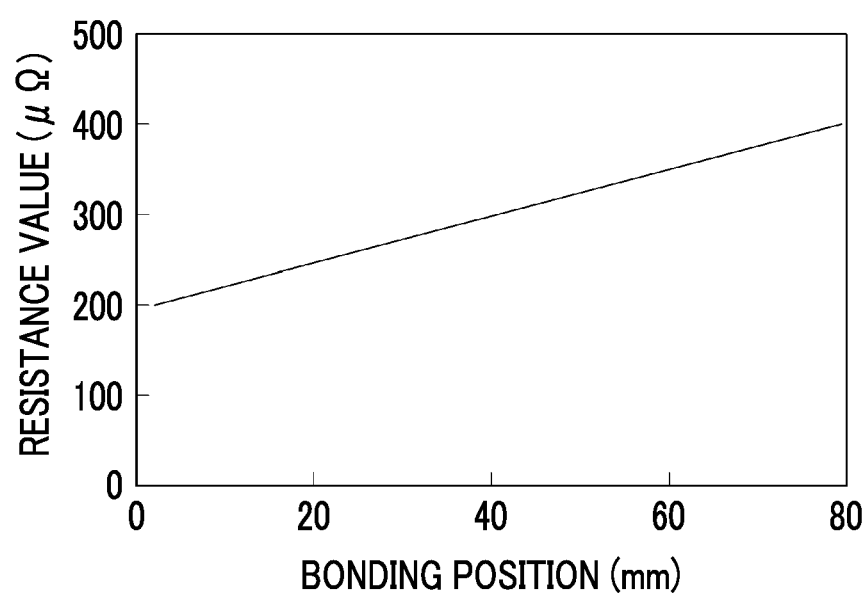
FIG. 10 shows a graph whose horizontal axis represents a bonding portion (mm) between positive and negative electrode current collecting portions and positive and negative electrode current collector exposed portions and whose vertical axis represents a member resistance value (µΩ).

<Measurement of member resistance value> As an indicator in consideration of increase and decrease in the internal resistance of the battery according to a change in position of the welding portions, a member resistance value between the positive and negative electrode terminals provided on the outer surface side of the lid and the welding portions of the positive and negative electrode current collecting portions was measured using a commercially available tester. Here, a sum value of a resistance value between the positive electrode terminal and the welding portion of the positive electrode current collecting portion, and a resistance value between the negative electrode terminal and the welding portion of the negative electrode current collecting portion was set as member resistance value ($\mu\Omega$). The measurement results are shown in the graph in FIG. 10. As can be clearly understood from the graph, as the distance from the positive and negative electrode terminals to the welding portions of the positive and negative electrode current collecting portions decreases, the member resistance value tends to decrease. Therefore, in the sealed secondary battery such as a lithium ion secondary battery including the laminated electrode body of this type, a shorter distance (for example, less than L/2) from the positive and negative electrode terminals to the welding portions of the positive and negative electrode current collecting portions is preferable accordingly. In addition, when an increase in the internal resistance of the battery is minimized, improvement of high rate characteristics and cycle characteristics can be expected.

<Nail penetration test> A nail penetration test which is widely used as a safety evaluation test for lithium ion secondary batteries was performed. Total gas release times of the batteries of Examples 1 to 5 were comparatively evaluated. Specifically, a nail with a diameter of about 5 mm was moved at a predetermined speed from the center of one wide surface of the batteries to the other wide surface in the thickness direction and penetrated therethrough. Then, fumes from through holes were observed, and a time until fuming stopped was measured. The results are shown in Table 1. The results are ranked 1, 2, 3, 4, and 5 in order from the shortest fuming duration time.

TABLE 1

| Test battery | Position of bonding portion | Fuming duration time | Determination |
|---|---|---|---|
| Example 1 | 8 mm (L/10, D/3) | 1 | Excellent |
| Example 2 | 12 mm (L/6.6, D/2) | 2 | Excellent |
| Example 3 | 20 mm (L/4) | 3 | Favorable |
| Example 4 | 40 mm (L/2) | 4 | Usable |
| Example 5 | 73 mm (L/1.1) | 5 | Not usable |

As shown in the column in Table 1, it was confirmed that a time until fuming stopped became shorter as the distance from the positive and negative electrode terminals to the welding portions of the positive and negative electrode current collecting portions became shorter. This indicates that the bonding portions and the vicinities thereof may serve as barriers against outflow of gases generated inside the laminated electrode body heated due to the occurrence of abnormal short circuiting such as nail penetration, and prevent gases from rapidly accumulating on the side of the lid on the upper part of the case, and reduce the level of fumes.

As described above, the sealed secondary battery such as the lithium ion secondary battery disclosed here includes the laminated electrode body that can obtain a high capacity, and has the current collecting structure having favorable structural stability and excellent high rate charging and discharging characteristics. Therefore, it can be suitably used as a power source for driving a vehicle (in-vehicle secondary battery).

What is claimed is:

1. A sealed secondary battery comprising:
a laminated electrode body having a structure in which a plurality of rectangular sheet-shaped positive electrodes and a plurality of rectangular sheet-shaped negative electrodes are alternatively stacked with separators therebetween, wherein each of the positive electrodes includes a rectangular sheet-shaped positive electrode current collector and a positive electrode active material layer formed on the positive electrode current collector, and each of the negative electrodes includes a rectangular sheet-shaped negative electrode current collector and a negative electrode active material layer formed on the negative electrode current collector;
an electrolyte; and
a rectangular case,
wherein the rectangular case includes a case body in which the laminated electrode body and the electrolyte are housed and a lid for closing an opening of the body,
at one end of each of the positive electrodes and the negative electrodes in a long side direction, a current collector exposed portion having no active material layer is formed in a short side direction,
the laminated electrode body has a configuration in which the current collector exposed portions of the positive electrodes are laminated at one end in the long side direction and separated into two bundles, and the current collector exposed portions of the negative electrodes are laminated at the other end in the long side direction and separated into two bundles,
a positive electrode current collecting portion that includes two positive electrode current collecting plates that extend in parallel to each other in the short side direction of the laminated electrode body, and a negative electrode current collecting portion that includes two negative electrode current collecting plates that extend in parallel to each other in the short side direction of the laminated electrode body, wherein the positive electrode current collecting portion and the negative electrode current collecting portion are attached to a case inner surface side of the lid,
bonding portions are formed where each of the two positive electrode current collecting plates are directly welded to each of the two bundles of the current collector exposed portions of the positive electrodes,
bonding portions are formed where each of the two negative electrode current collecting plates are directly welded to each of the two bundles of the current collector exposed portions of the negative electrodes,
wherein the structure of the laminated electrode body is a rectangular parallelepiped structure having a longest dimension having a length W, a shorter dimension having a length L defined by a distance between a top side of the laminated electrode body positioned close to the lid and a bottom side of the electrode body positioned close to a bottom of the case, and a thickness dimension having a length D extending in the lamination direction, and
wherein all bonding portions between the current collecting plates and the bundles of current collector exposed portions are located within a distance of D/2 from the top side of the laminated electrode body.

2. The sealed secondary battery according to claim 1, wherein
an adhesive is provided for the separators to improve adhesion to the plurality of rectangular sheet-shaped positive electrodes and the plurality of rectangular sheet-shaped negative electrodes that are alternatively stacked therebetween.

3. The sealed secondary battery according to claim 1, further comprising holding tapes located on a side of the laminated electrode body that faces an end of the case body that is opposite from an end of the case body having the lid.

4. The sealed secondary battery according to claim 1, wherein the separators are integrally formed together so as to be formed in a folded zigzag shape, wherein the plurality of positive electrode sheets and the plurality of negative electrode sheets are arranged in recesses of the zigzag shape.

* * * * *